May 10, 1966  F. W. BOOTH  3,250,114
DEWPOINT TRANSMITTER

Filed July 5, 1962  2 Sheets-Sheet 1

INVENTOR
FRANKLIN W. BOOTH

BY
ATTORNEYS

INVENTOR
FRANKLIN W. BOOTH

United States Patent Office

3,250,114
Patented May 10, 1966

3,250,114
DEWPOINT TRANSMITTER
Franklin W. Booth, 421 Cynthia Drive, Hampton, Va.
Filed July 5, 1962, Ser. No. 207,824
9 Claims. (Cl. 73—17)

The invention described herein may be manufactured and used by or for the Government of the United States of America for governmental purposes without the payment of any royalties thereon or therefor.

This invention relates generally to a detection apparatus, and more particularly to a dewpoint transmitter for detecting and indicating dewpoints in the lower end of the dewpoint spectrum of a gas regardless of pressure variations. The apparatus forming the subject matter of the presently disclosed invention may also be used to measure the vapor content of any mixture of a gas and a vapor, as well as to make a quantitative determination of known components of a particular gaseous mixture.

The determination of dewpoint is of particular importance in airborne flight measurements, in wind-tunnel research, in paint ovens, air-conditioning systems, various applications of meteorology and in various other processes and systems requiring accurate measurement and control of humidity.

Dewpoint indicating devices presently available are generally incapable of accurately indicating the dewpoint of a mixture of gas and vapor in a reasonable length of time when the gas pressure is high. Further, when the dewpoint is low, these present-day devices have proved inefficient in indicating dewpoint regardless of the gas pressure. For example, when the dewpoint is low and the gas pressure is high, existing devices will require a considerable period of time, usually an hour or more, to indicate a dewpoint, and this reading will then be an average reading over this time interval, and changing conditions over this period of time will not be indicated. These limitations are inherently due to the structural arrangements of the components thereof, since they usually depend upon the conductivity of vapor in the gas for operability wherein the vapor must condense into a conductive film between electrodes of the instrument before an accurate measurement can be determined. Since a minimum quantity of this conductive film must form between the electrodes before an indication can be given, this prohibits the detection of small quantities of vapor in a given gas. The electrical complexity of the presently known devices further results in considerable expense in the construction and maintenance thereof.

Accordingly, an object of the present invention is the provision of a novel dewpoint transmitter giving low dewpoint indications regardless of pressure.

Another object of this invention is the provision of a new and improved, inexpensive, and compact instrument to determine vapor content of any mixture containing a gas and a polar vapor.

Still another object of the instant invention is the novel use of a desiccant in a vapor determination instrument which is sensitive to moisture changes in a continuous gas flow system.

A further object of this invention is to provide an instantaneous and continuous dewpoint indication in a given system.

A still further object of the present invention is the provision of a reactivation circuit means wherein a vapor detector is reactivated at periodic intervals to obtain periodic and accurate determinations of vapor.

An additional object of this invention is the provision of a device that will give quantitative determinations of known components of a gas mixture.

In accordance with one aspect of the present invention, the foregoing and other objects are attained by providing an apparatus inducing a portion of a gas passing through a main gas flow tube to flow through a circulating line, into a pressure-resistant vessel having an enlarged chamber therein, and then back into the main gas flow tube by way of a return conduit. Two pairs of insulated electric wires pass through one wall of the pressure resistant vessel and are positioned therein so as to intersect the gas flow within the vessel with each wire pair being joined within the vessel by an individual heat-sensitive connection. A desiccant coating is provided on each heat-sensitive connection for detecting and absorbing vapor contained in the gas flowing thereagainst. An electric circuit is operatively connected to these electric wire detectors and includes a normally balanced electric bridge, any unbalance of which is amplified and indicated, and may be recorded, as a function of the adsorbed vapor. A reactivation circuit is also connected to one pair of the electric wires to reset or reactivate the system at adjustable periodic intervals, while the other wire pair is used only to cause balanced resistance in the normally balanced electric bridge as a result of the cooling effect of the gas flow thereon.

A more complete appreciation of the invention and many of the attendant advantages thereof will be readily appreciated as the same becomes better understood by reference to the following detailed description when considered in connection with the accompanying drawings wherein.

Figure 1:
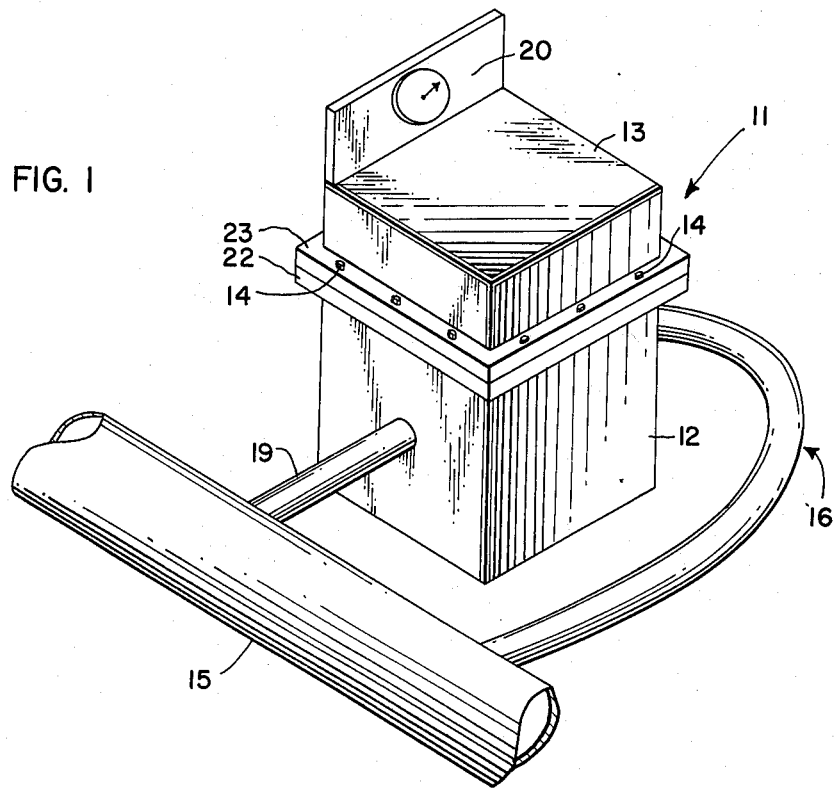
FIG. 1 is a perspective view of a dewpoint transmitter, according to the present invention in operative connection with a main gas flow tube.
Figure 2:
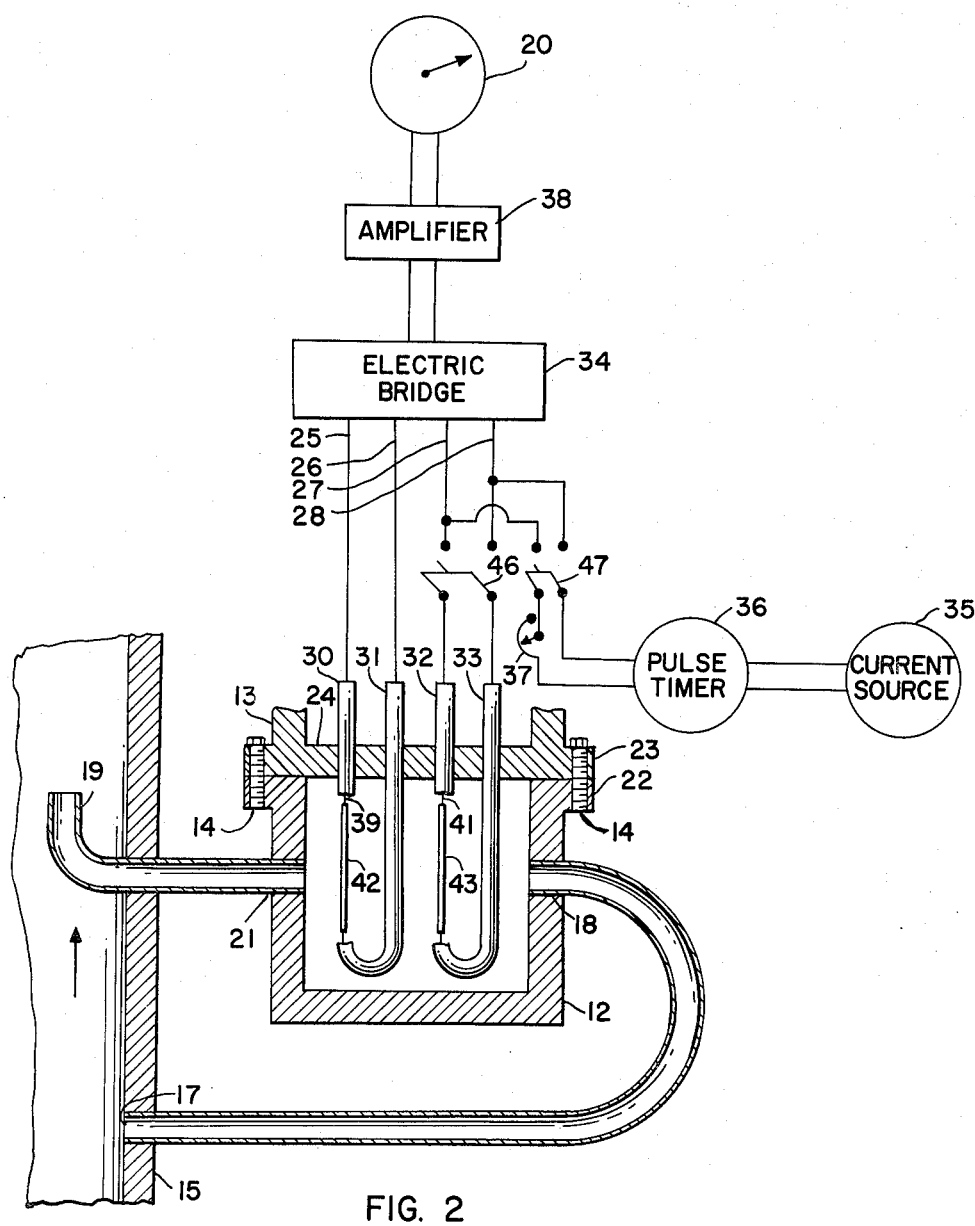
FIG. 2 is a fragmentary sectional elevation of the dewpoint transmitter shown in FIG. 1 with a schematic representation of electrical circuitry therefor; and, FIG. 3 is a pictorial view of a recording chart taken during a typical operational situation.

Referring now to the drawings wherein like reference numerals disignate identical or corresponding parts throughout the several views, and more particularly to FIG. 1 wherein the dewpoint transmitter instrument, generally indicated by reference numeral 11, is shown as comprising a hollow pressure vessel or container 12 with the cover therefor serving as the base of electrical circuitry casing 13 and secured in pressure-tight relationship with vessel 12 by suitable screws or bolts 14. Pressure-resistant vessel 12 comprises a relative thick-walled hollow structure and is connected to a main gas transmission tube or line 15, with the direction of gas flow designated by the arrow (FIG. 2), by means of circulating line or tube generally designated by reference numeral 16. The direction of gas flow through tube 15 is indicated in FIG. 2 by the arrow. An indicator or recording device 20 is secured on the face of electrical circuitry casing 13, the function of which will be more clearly expained hereinafter.

Referring now more particularly to FIG. 2, the bleed portion of induced circulating line 16 is fixedly attached at one end through and flush with the inlet 17 in the inner wall of main gas flow tube or line 15 and has the other end thereof positioned within inlet port 18 of pressure-resistant vessel 12. The return portion of circulating line 16, conduit 19, has one end positioned within outlet port 21 of pressure vessel 12 and the other end thereof extending through and fixedly attached, as by welding or brazing, to the wall of main gas pipe or line 15. The portion of conduit 19 that extends into gas pipe line 15 is turned ninety degrees to form a snout directed with the gas flow within pipe 15, the function of which will be more fully explained hereinafter.

The top of pressure-resistant vessel 12 has a flange 22 integrally formed thereon which mates with a corresponding flange 23 formed integral with a cover member 24 for pressure-resistant vessel 12. In the illustrated embodiment, cover member 24 also serves as the bottom of electric casing 13 with flanges 22 and 23 being secured in pressure sealing engagement by conventional means, such for example as bolts 14. Alternatively, flanges 22 and 23 may be omitted and cover member 24 secured, as by butt welding, not shown, to vessel 12.

Cover member 24 constitutes one wall of pressure-resistant vessel 12 and has four openings therein through which extend electric wires 25, 26, 27, and 28 protected, respectively, by pressure-type metallic sleeve members 30, 31, 32, and 33 hermetically sealed over the dielectric-coated wires. The sleeve members are sealed, as by welding, within cover member 24 to assure pressure-tight relationship between the parts.

Electric wires 25, 26, 27, and 28 may, when desired, extend to electric circuitry at a remote distance from pressure-resistant vessel 12, however in the illustrated embodiment, and as shown more particularly in FIG. 1, the required electric circuitry and indicating and recording means are united into a lightweight compact unitary structure. To accomplish this lightweight structure, as pointed out heretofore, the bottom of electric circuitry casing 13 constitutes cover member 24 for pressure-resistant vessel 12.

Referring once again to FIG. 2, the basic electric circuitry required is contained entirely within casing 13, with wire pair 25, 26, being connected to one branch of a Wheatstone bridge 34, and wire pair 27, 28 connected to the opposite branch of the bridge. Wire pair 27, 28 is also connected to a reactivation circuit which includes a current source 35, an adjustable timer 36, and rheostat 37, as will be more fully explained hereinafter. Bridge 34 is connected to an amplifier 38 which, in turn, connects to suitable, diagrammatically shown, indicating or recording means 20.

Portions of wire pair 25, 26 and pair 27, 28 within pressure resistant vessel 12 are without dielectric insulation and constitute very thin, low mass, heat sensitive elements 39 and 41 between the insulated portions of respective wire pairs 25, 26 and 27, 28. Heat sensitive elements 39 and 41 have identical, thin desiccant coatings 42 and 43, respectively, thereon and the coated portions are positioned within pressure resistant vessel 12 in such manner as to intersect the gas flow passing therethrough by way of inlet conduit 17 and outlet conduit 19. Desiccant coatings 42 and 43 may be of any well-known material that adsorbs moisture when dry and releases the adsorbed moisture when heated to a predetermined temperature. One such suitable desiccant material is commercially available under the trade name Molecular Sieves from the Linde Corporation, a division of Union Carbide. Molecular Sieves may be purchased in a wide range of pore sizes and this powdery substance is easily applied as uniform thin coatings, of a thickness from 0.5 to 15 microns, on element portions 39 and 41 by use of a suitable adhesive.

OPERATION

From the above description the operation of the device becomes apparent. Referring again to FIG. 2, the dewpoint transmitted is secured to main gas transmission line 15 by way of conduits 17 and 19 and switch 46 then closed. Subsequent high-pressure gas flow through line 15 forces, or induces by creating an aspirator effect at the end of conduit 19, a constant gas flow through the chamber of pressure resistant vessel 12. Desiccant coatings 42 and 43 an elements 39 and 41 intersect the gas flow within vessel 12 and immediately begin adsorbing the moisture contained in the gas flowing thereagainst. The act of adsorption effects the adhesion of an extremely thin layer of the polar vapor molecules to the individual particles of the dessicant material through magnetic attraction. It is readily apparent that since the area of desiccant coatings 42 and 43 are identical, the original and initial adsorption by each coating is the same and electric bridge 34 remains balanced. Upon closing of switch 47, current flows from current source 35 through pulse timer 36 to heat desiccant coating 43 instantly to its reactivation temperature with subsequent current flow through the circuit at periodic intervals under the control of timer 36. The reactivation of coating 43 is accomplished by supplying a predetermined amount of current during each pulse controlled by the timer to heat sensitive element 41 to "dry out" or break the magnetic attraction between the particles and release the moisture adsorbed. The value of this predetermined current flow is adjusted by rheostat 37 and will vary according to the residual water content of the desiccant coating employed. Heat sensitive element 39 for wire pair 25, 26 is not reactivated and is used to cause initial balanced resistance between the two heat sensitive elements 39 and 41 and to compensate for any resistance changes therein due to the artificial cooling action of the gas stream flowing over the wires. The heat of adsorption of desiccant coating 43 raises the temperature of heat sensitive element 41 in relation to the quantity of moisture adsorbed thereby which, in turn, is in direct relation to the quantity of moisture in the gas being tested. The increase in temperature of element 41 causes an unbalance in electric bridge 34 since the other branch of the bridge, being connected to heat sensitive wire portion 39 and its associated desiccant coating 42, is not reactivated and remains constant. This electrical unbalance, or signal, is amplified by amplifier 38 to a point where minor variations are easily detected and transmitted to the indicating or recording means 20.

Figure 3:
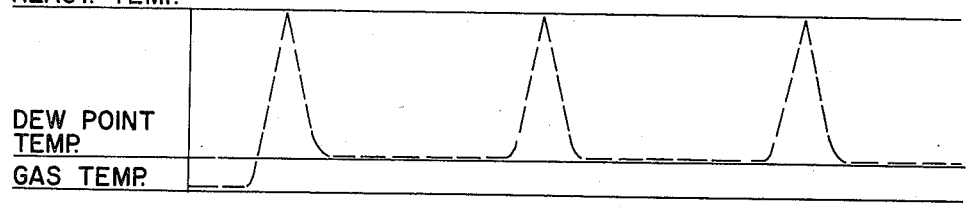

After original reactivation, referring now to FIG. 3, heat sensitive element 41 is rapidly cooled, by the flow of the gas stream thereagainst, to the temperature of the gas stream plus the heat of adsorption of the desiccant. The heat of adsorption of the desiccant is dependent upon the residual water content of the gas being tested and varies according to the dewpoint of the gas. Hence, the temperature indication recorded is readily converted by use of conventional dewpoint tables into grains per cubic foot of moisture in the gas being tested.

Due to the pressure resistant construction of vessel 12 and due to the readily obtainable quantitative measurement of moisture per cubic foot, regardless of pressure, the present system is operative and accurate even at extremely high gas pressures in main gas flow tube 15. Also, since desiccant coating 43 will adsorb moisture after reactivation where even a trace of moisture is present, and since even a slight unbalance in electric bridge 34 may be amplified to a point where it can be indicated or recorded by instrument 20, extremely low dewpoints can be readily detected and indicated regardless of the total gas pressure in main flow tube 15.

In addition, by the presently disclosed system, accurate dewpoint readings are made available at intervals as frequently as desired by regulating the operating time of pulse timer 36. Due to the short-interval pulse readings available, even slight variations in dewpoint can be followed instead of having to rely on an average dewpoint over an extended interval of time. This available rapid detection of moisture variations in the gas stream could prove invaluable in savings of time, expense, and manpower under numerous foreseeable circumstances.

Obviously, numerous modifications and variations of the present invention are possible in the light of the above teachings and by selective use of the coatings placed on the wires, indications other than dewpoint may be readily accomplished. For example, when using the Molecular Sieves coating described hereinabove, $CO_2$ concentration can be determined directly in an absolute dry atmosphere. Also by the use of an activated charcoal desiccant coating, $CO_2$ concentration can be obtained in atmosphere after first saturating the pores of the desiccant coating with $O_2$ and $N_2$. Also, in lieu of, or in addition to, the ninety degree curved portion, of outlet conduit 19, inlet conduit 17 may be provided with an extended portion leading into the face of the main gas flow to cause pressurized flow of gas through the dewpoint transmitter, when so desired.

It is therefore to be understood that, within the scope of the appended claims, the invention may be practiced otherwise than as specifically described.

What is claimed as new and desired to be protected by Letters Patent of the United States is:

1. Apparatus for dewpoint determination of a gas in a main gas flow tube, comprising: means for inducing gas flow from said gas flow tube through a pressure-resistant container having a gas passageway therethrough, adsorbent moisture-sensitive means within said pressure-resistant container intersecting the induced gas flow in said passageway, heat sensing means determining the rate of adsorption by said adsorbent moisture sensing means to thereby produce an electrical signal in response to adsorbent changes in said moisture-sensitive means, means amplifying said electric signal, means indicating said amplified signal in terms of dewpoint of the gas, and an electric heating circuit in operative connection with said moisture-sensitive means for selectively releasing moisture from at least a portion of said moisture-sensitive means.

2. Apparatus for the determination of dewpoint of a gas, comprising: a pressure-resistant container having a gas passageway therethrough, a gas flow conduit having one end thereof connected to the gas passageway of said pressure-resistant container and the other end thereof connected to a source of gas flow, two pair of insulated electric wires extending through one wall of said pressure-resistant container and having portions thereof in intersecting relationship with gas flow in said gas passageway, first circuit means connected to said two pair of wires, second circuit means connected to one of said pair of wires, said first circuit including indicating means and said second circuit including means for selective actuation thereof, at least part of said wire portions comprising a heat-sensitive element between members of the respective pair and each said heat-sensitive element having a desiccant coating thereon to adsorb moisture entrained in the gas flow whereby, upon selective actuation of said second circuit said desiccant coating on said one pair of wires will be dried and a function of any subsequent moisture adsorbed thereby will be indicated by said indicating means.

3. Apparatus for the determination of dewpoint of a gas passing through a gas flow tube, comprising: a hollow pressure-resistant vessel having at least one entrance and at least one exit port to form a gas passageway therethrough, first conduit means leading from the gas flow tube to said entrance port, second conduit means leading from said exit port to the gas flow tube, two pairs of insulated electric wires extending through one wall of said pressure-resistant vessel and having portions thereof in intersecting relationship with gas flow through said gas passageway, at least part of said wire portions comprising a heat-sensitive connection between members of the respective pair, each said heat-sensitive connection having a desiccant coating thereon, electrical circuit means connected to one of said pair of wires whereby, when electric current is applied thereto said heat-sensitive connection of said one pair of wires and its associated desiccant coating are heated sufficiently to dry out any moisture previously adsorbed by said desiccant coating and indicating means operatively connected to said pairs of wires to indicate a function of subsequent moisture adsorbed by the dry desiccant coating on said one pair of wires.

4. A dewpoint transmitter comprising: in combination, a main gas flow tube having a high pressurized gas flowing therethrough and having at least one side wall opening therein, and a hollow pressure-resistant vessel adjacent to and fixedly attached to said gas flow tube, said pressure-resistant vessel having means forming an inlet portion and an outlet portion for the passage therethrough of a gas, a first conduit having one end thereof perpendicularly sealed in said side wall opening and the other end thereof opening into said inlet portion of said pressure-resistant vessel, a second conduit leading from said outlet portion of said pressure-resistant vessel, a first and a second pair of insulated electric wires extending through one wall of said pressure-resistant vessel and having portions thereof in intersecting relationship with gas flowing between said inlet and outlet portions, at least a part of said wire portions comprising a heat-sensitive element between members of the respective pair, each said heat-sensitive element having a desiccant coating integral therewith; a normally balanced bridge circuit having opposite branches thereof operatively connected to said first and second pair of electric wires, a reactivation circuit connected to one of said pair of electric wires, said reactivation circuit including a current source and a pulse timer to apply current to said second pair of electric wires at periodic intervals, amplifier means in operative relationship with said bridge circuit to amplify any changes in the balance thereof, and indicating means connected to said amplifier means.

5. A dewpoint transmitter according to claim 4 wherein said second conduit means extends perpendicularly through one wall of said main gas flow tube with the end portion thereof bent to be parallel with direction of gas flow in said main gas flow tube, whereby gas flowing through said pressure-resistant vessel reenters said main gas flow tube in the same direction of flow as the main gas flow therethrough.

6. A dewpoint transmitter comprising: in combination, a gas flow tube having at least one side wall opening therein, and a hollow pressure-resistant vessel adjacent to and fixedly attached to said gas flow tube, said pressure-resistant vessel having an inlet opening and an outlet opening for the passage therethrough of a gas, an inlet conduit having one end thereof in said side wall opening and the other end thereof extending into said inlet opening of said pressure-resistant vessel in pressure-tight relationship therewith, outlet conduit means sealed in said outlet opening of said pressure-resistant vessel, a first and a second pair of insulated electric wires extending through one wall of said pressure-resistant vessel and having portions thereof in intersecting relationship with said inlet and outlet openings, at least a part of said wire portions comprising a heat-sensitive element between members of the respective pair, each said heat-sensitive element having an adsorbent material integral therewith, a normally balanced bridge circuit having opposite branches thereof operatively connected to said first and second pair of electric wires, a reactivation circuit connected to said second pair of electric wires, said reactivation circuit including a current source and a pulse timer to apply current to said second pair of electric wires at periodic intervals, an amplifier means in operative relationship with said electric bridge, and recording means connected to said amplifier means indicating changes in said bridge balance.

7. A dewpoint transmitter comprising: in combination, a main gas flow tube having a gas flowing therethrough and having at least one side wall opening therein, and a thick-walled pressure-resistant container adjacent to and fixedly attached to said gas flow tube, said pressure-resistant container having an inlet opening and an outlet opening in the side walls thereof for the passage therethrough of a gas, an inlet conduit having one end thereof sealed in said side wall opening and the other end thereof extending into said inlet opening of said pressure-resistant container, outlet conduit means sealed in said outlet opening of said pressure-resistant container, a first and a second pair of insulated electric wires extending through one wall of said pressure-resistant container with portions thereof in intersecting relationship with the gas flowing between said inlet and outlet openings, at least a part of said wire portions comprising a relatively thin heat-sensitive element between members of each respective pair, each said heat-sensitive element having an adsorbent material integral therewith, a normally balanced bridge circuit having opposite legs thereof connected to said first and second pair of electric wires, amplifier means in operative relationship with said bridge circuit, indicating means connected to said amplifier means, a reactivation circuit connected to one of said pairs of electric wires, said reactivation circuit including a current source and an adjustable pulse timer to apply current to said one pair of electric wires at adjustable periodic intervals whereby, when part of the gas flowing through said main gas flow tube is induced to flow through said pressure-resistant container, moisture therein is adsorbed by each said adsorbent coating, said reactivation circuit periodically drys out the adsorbed moisture from said one pair of electric wires and the adsorbent material on said other pair of electric wires remains the same causing a periodic unbalance in said electric bridge which creates an electric signal that is amplified and transmitted as dewpoint of the gas by said indicating means.

8. A dewpoint transmitter according to claim 7 and further including metallic pressure-resistant sleeve members sealed around each member of said first and second pair of insulated wires at least over the portion thereof that passes through said one wall of said pressure-resistant container.

9. An apparatus for the quantitative determination of a known component of a gas, comprising: an electrical circuit including a pair of heat sensitive elements positionable in the flow path of a gas; sections of said pair of heat sensitive elements being coated with an adsorbent, said adsorbent being a desiccant material, means for exuding a component adsorbed by said adsorbent from at least one member of said pair; and means including an amplifier and an indicator for transmitting temperature changes in said heat sensitive elements as a quantitative function of the adsorbed gas component.

References Cited by the Examiner

UNITED STATES PATENTS

| | | | |
|---|---|---|---|
| 2,444,613 | 7/1948 | McCombie et al. | 73—29 |
| 2,718,141 | 9/1955 | Richards | 73—75 |
| 2,768,069 | 10/1956 | Thompson | 23—255 |
| 2,817,229 | 12/1957 | Beard | 73—26 |
| 2,826,908 | 3/1958 | Skarstrom | 73—23.1 |
| 2,845,790 | 8/1958 | Eddy | 73—29 |
| 2,941,395 | 6/1960 | Myer | 73—23 |

FOREIGN PATENTS 616,966    3/1961    Canada.

RICHARD C. QUEISSER, *Primary Examiner.*

JOSEPH P. STRIZAK, C. A. RUEHL, *Examiners.*